United States Patent
Liau et al.

(10) Patent No.: US 6,650,698 B1
(45) Date of Patent: Nov. 18, 2003

(54) NON-LINEAR EQUALIZATION FOR THE UPSTREAM DATA CONNECTION OF 56K PCM MODEMS

(75) Inventors: Thomas C. Liau, Irvine, CA (US); Keith T. Chu, Laguna Niguel, CA (US); Wei K. Tsai, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/408,367

(22) Filed: Sep. 29, 1999

(51) Int. Cl.$^7$ ............................................... H03K 5/159
(52) U.S. Cl. ...................... 375/229; 375/230; 375/231; 375/232; 375/233; 375/234
(58) Field of Search .................. 375/296, 229, 375/230, 231, 232, 233, 234, 235, 236; 714/715

(56) References Cited

U.S. PATENT DOCUMENTS

| | | | |
|---|---|---|---|
| 4,615,038 A | * 9/1986 | Lim et al. ..................... 375/14 |
| 5,881,108 A | * 3/1999 | Herzberg et al. ........... 375/296 |
| 6,374,375 B1 | * 4/2002 | Yip et al. .................... 714/715 |
| 6,414,989 B1 | * 7/2002 | Olafsson et al. ............ 375/229 |

* cited by examiner

Primary Examiner—Stephen Chin
Assistant Examiner—Sam K. Ahn
(74) Attorney, Agent, or Firm—Christopher J. Rourk; Akin Gump Strauss Hauer & Feld, LLP

(57) ABSTRACT

An apparatus and method for minimizing nonlinear distortions in computer system communications where the upstream signal from a client modem to a server modem is periodically sampled, the samples being utilized by a non-linear decision feedback equalizer to periodically produce sets of equalizer coefficients. The equalizer coefficients are sent via an independent communication channel downstream to the client modem to continuously update distortion-minimizing adjustments to the client modem's upstream output. The samples are taken periodically in order to update the non-linear decision feedback equalizer so that it can provide appropriate equalizer coefficients for the changing characteristics of the upstream signal. The method includes identifying, by a first communication system, nonlinear equalization parameters to be used by a second communication system to minimize nonlinear distortions on a primary communication channel. The method also includes transmitting, by the first communication system, the nonlinear equalization parameters to the second communication system by a secondary communication channel. In addition, the method includes receiving, by the second communication system, the nonlinear equalization parameters from the first communication system. Finally, the method includes utilizing, by the second communication system, the nonlinear equalization parameters to minimize nonlinear distortion on the primary communication channel.

22 Claims, 3 Drawing Sheets

NON-LINEAR EQUALIZATION FOR THE UPSTREAM DATA CONNECTION OF 56K PCM MODEMS

BACKGROUND

1. Technical Field

This invention relates to computer system communication; and, more specifically, it relates to an apparatus and method for minimizing nonlinear distortion along computer communication data paths.

2. Description of Related Art

Conventional modems of today are capable of downstream data transfer (server to client) of up to 56,000 bps. The upstream side of the connection (client to server), however, is typically able to transfer data at a maximum rate of only 33,600 bps. Conventional systems utilizing protocols such as the K56Plus™, K56Flex™ and V.90 systems enjoy a digital link on the downstream side of the connection between the Central Office and the client modem. This digital link minimizes the presence of local loop impairments such as linear and non-linear distortion in the transferred signal which make them capable of reaching downstream transfer rates of up to 56,000 bps. The upstream connection, on the other hand, typically utilizes analog modulation of the signal, which, by nature, encounters a greater amount of signal distortion and hence, a reduced transfer rate.

Non-linear distortion is a great impediment to high-speed upstream data transfer in modems of today. With the utilization of standard protocols, such as $\mu$-Law and A-Law, Pulse Code Modulation (PCM) encounters difficulties with frequency-specific distortion that cause transmission errors to occur. The transmission errors typically affect the maximum attainable transmission rate significantly. Nonlinear distortions within the upstream data transfer in conventional systems are partially caused by future symbol effects created by impedance echo and reflection. As a signal defining a first symbol travels from the client to the server, another signal defining a second symbol may be leaving the client and heading towards the server, also. The transmission of the second symbol adversely affects the transmission of the first symbol because of echo and reflection phenomena. This inter-symbol effect makes it possible for future symbols to distort the reception of current symbols; thus, introducing error and slowing potential data transfer rates.

Other deficiencies and disadvantages of the prior art will become apparent to one skilled in the art after comparing such prior art with the present invention as described herein.

SUMMARY OF THE INVENTION

Various aspects of the present invention may be realized through a server-side equalization system that includes a primary communication channel for transmission of a primary signal, and a secondary communication channel for transmission of a secondary signal. The equalization system also includes a client communication device for sending the primary signal. This client communication device has a pre-equalization module, which modifies the primary signal being sent out, and is communicatively coupled to the primary communication channel. The equalization system further includes a server communication device, which has a linear equalizer communicatively coupled to the primary communication channel, to receive data from the primary communication channel and a sampling module, which is communicatively coupled to the primary communication channel, to sample the primary signal. Lastly, the equalization system includes a non-linear decision feedback equalizer that is communicatively coupled to the secondary communication channel to provide pre-equalization coefficients to the pre-equalization module of the client communication device based on analysis of samples taken from the sampling module. The pre-equalization coefficients are used by the pre-equalization module for correcting non-linear distortions in the primary signal sent upstream to the server communication device.

In one embodiment, the primary communication channel and the secondary communication channel are included in a local loop. In another embodiment, the client communication device is a computer modem. In yet another embodiment, the server communication device is a computer modem. In another alternative, the linear equalizer is utilized with a non-linear decision feedback equalizer to establish a set of equalizer coefficients to be sent by the secondary communication channel to the client modem for updating the pre-equalization module.

In another embodiment, the sampling module is a slicer. In yet another embodiment, the client communication device performs some of the analysis of the samples taken by the sampling device in developing the pre-equalization coefficients. In still another embodiment, the client communication device performs all of the analysis of the samples taken by the sampling device to develop the pre-equalization coefficients for the client communication device. In another embodiment, the client communication device and the server communication device each perform a part of the analysis of the samples to develop pre-equalization coefficients and exchange the pre-equalization coefficients with each other. In yet another embodiment, the client communication device and the server communication device work together in the analysis of the samples taken by the sampling device to develop pre-equalization coefficients for the client communication device. In another embodiment, the pre-equalization module is located in the server communication device and the pre-equalization occurs in the server communication device.

Various aspects of the present invention may also be realized through a communication system that includes a primary communication channel for transmission of a primary signal, and a secondary communication channel for transmission of a secondary signal. The communication system also includes a first communication device, which has a pre-equalization module to modify the primary signal and which is communicatively coupled to the primary communication channel, and a second communication device, which has a first equalizer that is communicatively coupled to the primary communication channel to receive data from the primary communication channel. The communication system further includes a sampling module that is communicatively coupled to the primary communication channel to sample the primary signal and a second equalizer that is communicatively coupled to the secondary communication channel to provide pre-equalization coefficients to the pre-equalization module of the first communication device.

In one embodiment, the first equalizer is a linear equalizer that is utilized with the second equalizer to establish a set of coefficients to be sent by the secondary communication channel to the first modern to update the pre-equalization module. In another embodiment, the second equalizer is a non-linear decision feedback equalizer that has pre-equalization coefficients used by the pre-equalization module for correcting non-linear distortions in the primary signal being sent upstream to the second communication device.

In another embodiment, the first communication device performs part of the analysis of the samples taken by the sampling device to develop the pre-equalization coefficients. In yet another embodiment, the first communication device performs all of the analysis of the samples by itself. In still another embodiment, the first communication device and the second communication device each perform a portion of the analysis of the samples and exchange the pre-equalization coefficients with each other. In another embodiment, the first communication device and the second communication device work together in the analysis of the samples taken by the sampling device to develop the pre-equalization coefficients for the first communication device.

In another embodiment, the pre-equalization module and the pre-equalization process are both located in the second communication. In another embodiment, the first communication device is a client modem. In yet another embodiment, the second communication device is a server modem. In still another embodiment, the first communication device is a server modem. In still another embodiment, the second communication device is a client modem.

Various aspects of the principles according to the present invention may also be realized through a method for performing non-linear equalization. The method comprises identifying, by a first communication system, nonlinear equalization parameters to be used by a second communication system to minimize nonlinear distortions on a primary communication channel. The method also includes transmitting, by the first communication system, the non-linear equalization parameters to the second communication system by a secondary communication channel. The method further includes receiving, by the second communication system, the nonlinear equalization parameters from the first communication system. Finally, the method includes utilizing, by the second communication system, the nonlinear equalization parameters to minimize nonlinear distortion on the primary communication channel.

In one embodiment of the present invention, the identification of nonlinear equalization parameters includes sampling, by the first communication system, the primary communication channel and calculating, based on the samples, the nonlinear equalization parameters to be used use by the second communication system.

DETAILED DESCRIPTION OF DRAWINGS

Figure 1:
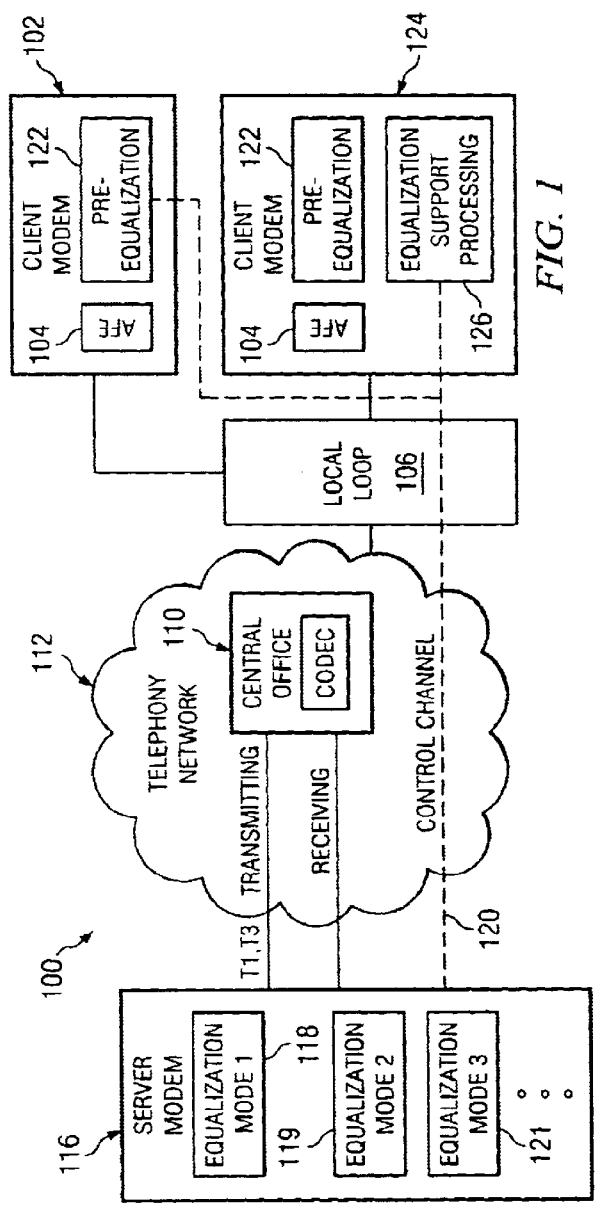
FIG. 1 is a block diagram of an exemplary equalization system implemented in accordance with the principles of the present invention.

FIG. 1 is a block diagram of an exemplary equalization system 100 implemented in accordance with the principles of the present invention. The equalization system 100 is provided in one embodiment, having a client modem 102 that operates only in a first mode to assist in providing upstream equalization using pre-equalization 122.

The client modern 102 encodes and decodes communicated data via PCM (Pulse Code Modulation) signals using an analog front end 104. It is able to send data from the client modem 102 to the server modem 116 (upstream) or to receive data sent from the server modem 116 to the client modem 102 (downstream). The upstream analog signal travels from the client modem 102 through a local loop 106. The local loop typically consists of copper wires running between a telephone subscriber's location and a telephone company's switch. From the local loop 106, the analog signal is converted to a digital format by a Codec (Coder/Decoder) in a telephone company's central office 110. The digital signal travels through a network 112 via T1 or T3 media 114. The digital signal terminates at a computer server 116, whereupon the signal is processed.

The server 116 analyzes the received signal to determine the severity of nonlinear distortion in the upstream path. Next, the server 116 determines which of a plurality of equalization modes 118, 119, 121 to employ for the situation. The server 116 also considers the capabilities of the client modem 102. Based on the processing capability of the client modem 102, among other things, the server 116 determines the allocation of pre-equalization analysis processing between the server 116 and the client modem 102.

In an embodiment of the client modem such as is given by 102, no analysis processing ability exists. In a situation with a passive client modem 102 such as this, the server modem 116 would recognize that a specific equalization mode 118, 119, 121 would be necessary, and that the server modem 116 would perform the entirety of the pre-equalization analysis. In this situation, the server 116 would first analyze the nonlinear distortions being received from the network 112. The server 116 then would determine whether to institute pre-equalization and, if so, it would determine what mode of equalization 118, 119, 121 is necessary based on the severity of distortion.

The server modem 116 might select an equalization mode #1 118 for situations of light non-linear distortion. For this, it might utilize 3 order equalization, for example. For situations of greater non-linear distortion, the server modem 116 might select an equalization mode #2 119, which might utilize a greater order equalization, such as $5^{th}$ order. In situations of even greater non-linear distortion, the server modem 116 could select an equalization mode #3 121, for example, which could be $9^{th}$ order. There could be a wide range of different equalization modes for the server modem 116 to select from.

In a situation where pre-equalization is determined necessary, the server 116 provides pre-equalization coefficients (not shown) via a control channel 120. In a typical embodiment, the pre-equalization coefficients are determined based on a mathematical combination of the analysis of a decision feedback equalizer with the analysis of a feed-forward equalizer. The client modem 102 is continually updated with pre-equalization coefficients while the server 116 is determining that distortions exist. With the continual update of pre-equalization coefficients, the client modem 102 utilizes the coefficients to perform pre-equalization 122 of the outgoing analog signal for the client modern 102.

With the pre-equalization 122 that has occurred upon the analog signal being sent to the server 116, nonlinear distortions are minimized. The pre-equalization coefficients are selected to counteract the distortive effects occurring within the local loop.

In initial communications, the server 116 may determine that there is not sufficient distortion being recognized to justify pre-equalization 122. In this situation, the server 116 would not provide any pre-equalization coefficients to the client modem 102. In the situation of ongoing communications, the server 116 may determine that there is not sufficient distortion being recognized to justify additional pre-equalization 122. In this situation, the server 116 would not provide any further pre-equalization coefficients to the client modem 102.

In another embodiment, the server 116 determines that the client modem 124 possesses the necessary processing ability to support doing either a partial amount or the entire amount of pre-equalization analysis. In a situation where the server 116 is linked to a client modem 124 such as this, the server 116 has the option to either perform the entire pre-equalization analysis itself, to perform a portion of the pre-equalization analysis with the client modem 124 doing the remainder, or to have the client modem 124 perform the entire pre-equalization analysis. For example, the server 116 may determine that pre-equalization is necessary and that the client modem 124 is capable of performing a portion of the analysis. The server 116 may determine that the client modem 124 should perform at least a portion of this equalization support processing 126 for a number of possible reasons. For example, it may be beneficial for the server to utilize outside processing resources to keep its own processing speed high. Also, the server may determine that the client modem 124 has a uniquely advantageous perspective to perform at least a portion of the equalization support processing 126.

On the other hand, the server 116 may determine that the client modem 124, although capable of performing equalization support processing at 126, should not do so in order to prevent, for example, excess battery consumption in the case of a portable computer.

In the situation where the server 116 determines that the client modem 124 should perform either a portion or the entirety of the equalization support processing 126, the client modem 124 will also do at least a portion of the analysis and pre-equalization coefficient determination. The client modem 124, similar to the client modem of 102, would then utilize the pre-equalization coefficients in adjusting the analog signal output to prevent nonlinear distortions being received by the server 116.

Figure 2:
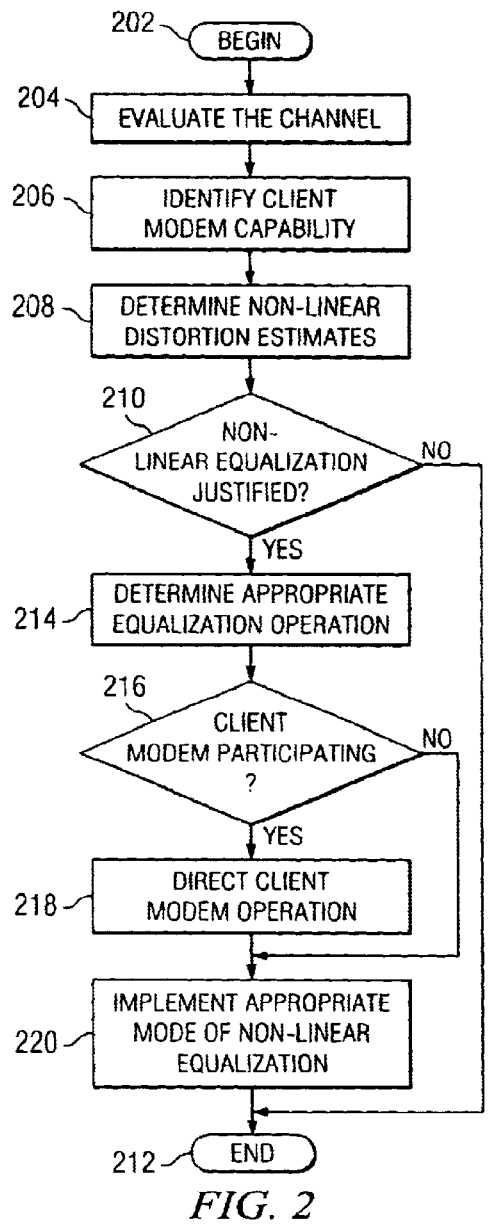
FIG. 2 is a flow chart describing the operation of an exemplary embodiment of the server modem.

FIG. 2 is a flow chart describing the operation of the server modem 116. Upon utilization of the system 202, the server modem 116 evaluates the quality of the signal 204 within the upload channel. The server modem 116 then determines the capability 206 of the client modem 102 to determine whether or not the client modem 102 is capable of equalization support processing 126. The server modem 116 then determines the linear and nonlinear estimates of distortion 208 present in the signal from the client modem 102.

Next, the server modem 116 decides whether or not the performance of nonlinear equalization is justified 210. If the server modem 116 decides that the performance of nonlinear equalization is not justified, nothing is done 212. However, if the performance of nonlinear equalization is determined to be justified 210, the amount and method of equalization is determined 214. Next, the server determines whether the client modem 102 is participating 216 in the equalization analysis based on whether or not an appropriate amount of processing ability was found to be present 206 in the client modem 102. If the server modem 116 determines that client modem participation 216 is necessary and possible, the server 116 directs the client modem to perform the requisite operations 218 to assist the server 116 in equalization analysis. If client modem participation is either not possible or not desired 216, the server simply implements the appropriate mode of nonlinear equalization 220.

Figure 3:
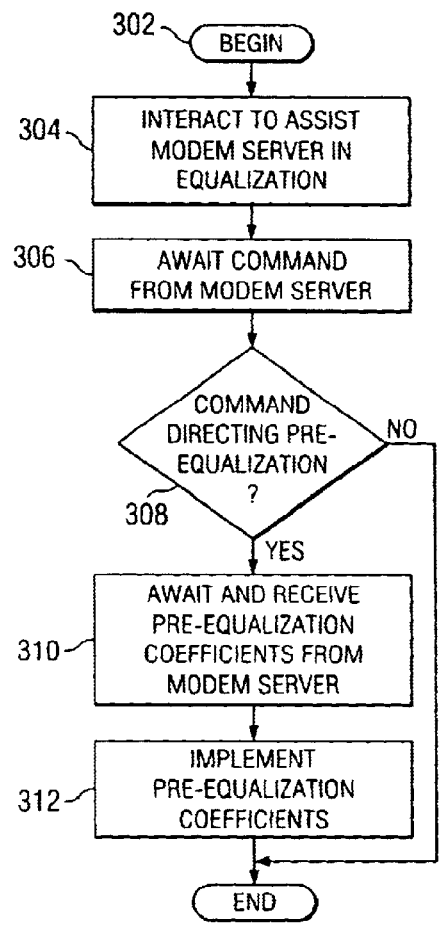
FIG. 3 is a flow chart describing the operation of an exemplary embodiment of a non-processing client modem.

FIG. 3 is a flow chart describing the operation of a non-processing client modem 102. Upon the initiation of operation 302 of a client modem 102 lacking the ability for equalization support processing 126, the client modem 102 interacts with the server modem 116 to assist the server modem's 116 equalization processing 304. The client modem 102 waits for a command signal from the server modem 116 directing its action 306. If the server modem 116 is directing 308 pre-equalization for the client modem 102, the client modem 102 waits for and then receives pre-equalization coefficients 310 from the server modem 116. These pre-equalization coefficients are then implemented by the modem 312 to minimize nonlinear distortions on the client modem's 102 outgoing communication channel.

Figure 4:
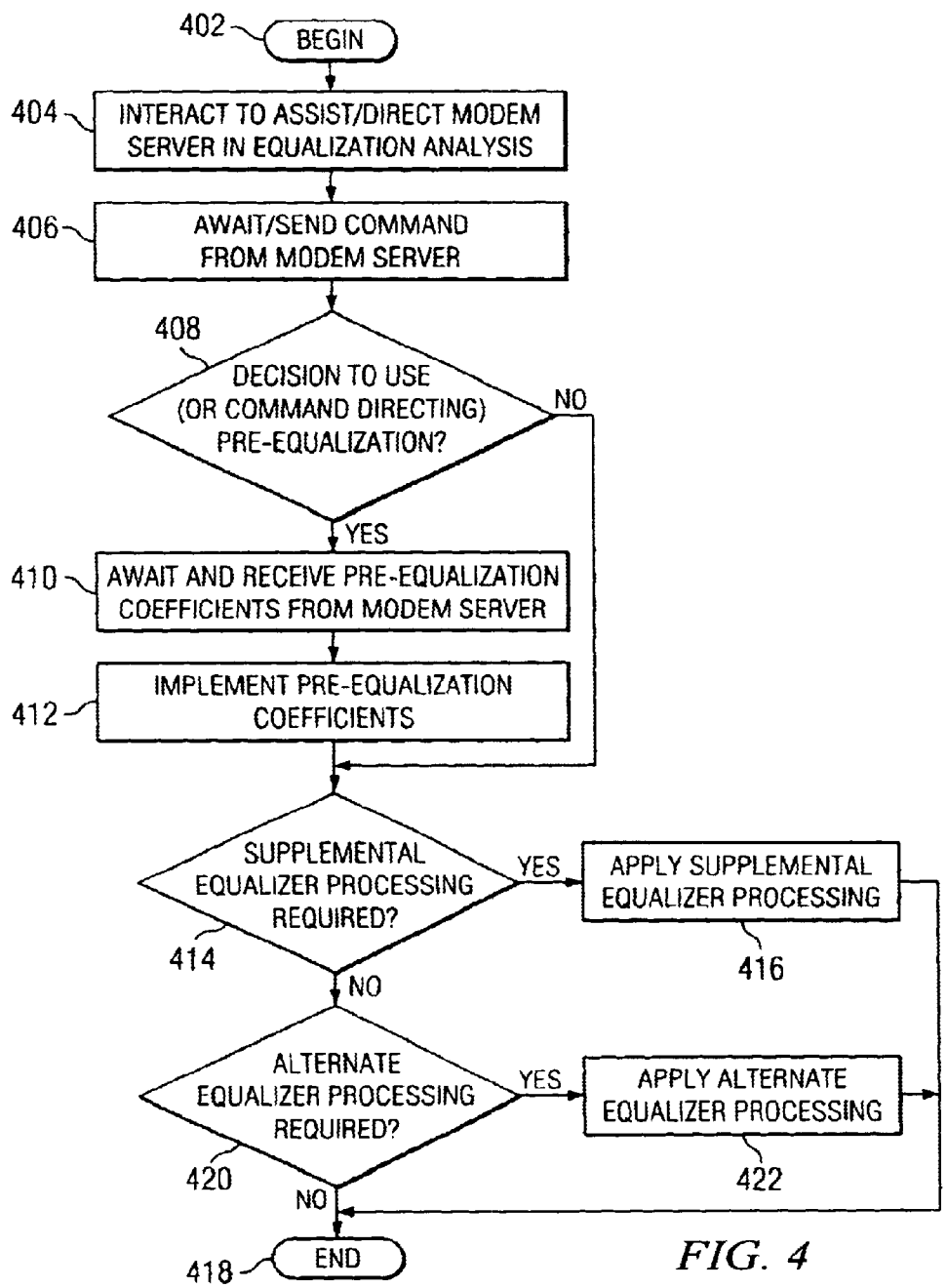
FIG. 4 is a flow chart describing the operation of an exemplary embodiment of a client modem with processing ability.

FIG. 4 is a flow chart describing the operation of a client modem 124 having adequate processing ability to provide equalization support processing 126. Upon initiation of the process 402, the client modem 124 interacts with the modem server 116 to assist the modem server 116 or to direct the modem server 116 in an equalization analysis 404. Depending on the configuration, the client modem 124 then, either waits for a command from the server modem 116 or sends a command to the server modem 116 regarding the initiation of equalization analysis 406. In the case of the client modem 102 awaiting a command from the server 406, if the decision to use pre-equalization is made by the server modem 116, the client modem 124 awaits and then receives pre-equalization coefficients from the server 410 to then be implemented 412 for minimizing nonlinear distortions in the communication channel.

Because the client modem 124 is capable of equalization support processing, the server 116 may decide to utilize the client modem's 124 resources. First, the modem decides whether supplemental equalizer processing is required 414. If so, the client modem 124 would be directed to provide supplemental equalizer processing 416 for the server modem 116 by utilizing its processing ability to perform a portion of the equalization analysis. After this, the process would be complete 418. Supplemental equalizer processing may not be required 414. If not, alternate equalizer processing may be utilized. In this, the server may request that the client 124 modem perform all of the equalization analysis and processing. If the server modem 116 decides to let the client modem 124 perform all of the functionality 420, the client modem 124 itself would analyze the signal, develop the pre-equalization coefficients, and utilize the coefficients to minimize outgoing nonlinear distortions 422. If the server decides that neither supplemental 416 nor alternate 422 equalizer processing is required, the process ends 418.

Figure 5:
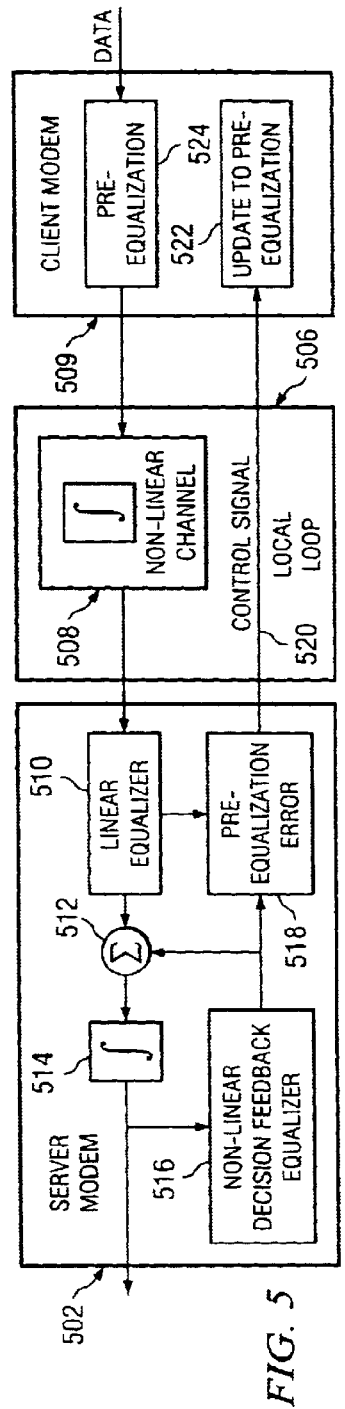
FIG. 5 is a block diagram illustrating an exemplary embodiment of the invention, with the server modem performing the equalization analysis and developing the pre-equalization coefficients for the client modem.

FIG. 5 is a block diagram illustrating an exemplary embodiment of the invention, with the server modem 502 performing the equalization analysis and developing the pre-equalization coefficients for the client modem 504. In a typical embodiment, the client modem 504 sends data upstream through a local loop 506. This communication channel may contain nonlinear distortions and is denoted as the nonlinear channel 508. Upon arrival at the server modem 502, the signal received is corrected for linear distortions by a linear equalizer 510. The signal then enters into a feedback loop consisting of a summing point 512, where the feedback is returned. Next, the signal enters a slicer 514, where the signal is partitioned into discreet and separate bandwidths for analyzing distortion at different frequencies (nonlinear distortion analysis). The partitioned signal is analyzed for nonlinear distortions by a nonlinear decision feedback equalizer 516. The nonlinear distortions are continuously monitored with this feedback loop. Information is taken from the linear equalizer 510 as well as from the nonlinear decision feedback equalizer 516 to determine the amount of pre-equalization error 518. Pre-equalization coefficients are developed and provided to the client modem 504 via a control communication channel 520, and the pre-equalization coefficients are utilized to continuously update 522 the pre-equalization process 524.

What is claimed is:

1. A server-side equalization system, comprising:
a primary communication channel for transmission of a primary signal;
a secondary communication channel for transmission of a secondary signal;
a client communication device sending the primary signal and having a pre-equalization module communicatively coupled to the primary communication channel, the pre-equalization module for modifying the primary signal being sent by the client communication device;
a server communication device having a linear equalizer communicatively coupled to the primary communication channel for receiving data from the primary communication channel;
a sampling module communicatively coupled to the primary communication channel for sampling the primary signal; and
a non-linear decision feedback equalizer communicatively coupled to the secondary communication channel for providing pre-equalization coefficients to the pre-equalization module of the client communication device based on analysis of samples taken from the sampling module, the pre-equalization coefficients being used by the pre-equalization module for correcting non-linear distortions in the primary signal being sent upstream to the server communication device, and wherein the client communication device performs a portion of the analysis of the samples taken by the sampling device for developing the pre-equalization coefficients.

2. The server-side equalization system of claim 1, wherein the primary communication channel and the secondary communication channel are included in a local loop.

3. The server-side equalization system of claim 1, wherein the client communication device is a computer modem.

4. The server-side equalization system of claim 1, wherein the server communication device is a computer modem.

5. The server-side equalization system of claim 1, wherein the linear equalizer is utilized with a non-linear decision feedback equalizer to establish a set of equalizer coefficients to be sent via the secondary communication channel to the client modem for updating the pre-equalization module.

6. The server-side equalization system of claim 1, wherein the sampling module is a slicer.

7. The server-side equalization system of claim 1, wherein the client communication device and the server communication device work together in the analysis of the samples taken by the sampling device for development of pre-equalization coefficients for the client communication device.

8. The server-side equalization system of claim 1, wherein the pre-equalization module is located in the server communication device and the pre-equalization occurs in the server communication device.

9. A server-side equalization system, comprising:
a primary communication channel for transmission of a primary signal;
a secondary communication channel for transmission of a secondary signal;
a client communication device sending the primary signal and having a pre-equalization module communicatively coupled to the primary communication channel, the pre-equalization module for modifying the primary signal being sent by the client communication device;
a server communication device having a linear equalizer communicatively coupled to the primary communication channel for receiving data from the primary communication channel;
a sampling module communicatively coupled to the primary communication channel for sampling the primary signal; and
a non-linear decision feedback equalizer communicatively coupled to the secondary communication channel for providing pre-equalization coefficients to the pre-equalization module of the client communication device based on analysis of samples taken from the sampling module, the pre-equalization coefficients being used by the pre-equalization module for correcting non-linear distortions in the primary signal being sent upstream to the server communication device, and wherein the client communication device and the server communication device each perform a portion of the analysis of the samples for development of pre-equalization coefficients and exchange the pre-equalization coefficients with each other.

10. A communication system, comprising:
a primary communication channel for transmission of a primary signal;
a secondary communication channel for transmission of a secondary signal; a first communication device having a pre-equalization module communicatively coupled to the primary communication channel, the pre-equalization module for modifying the primary signal being sent by the first communication device;
a second communication device having an equalizer communicatively coupled to the primary communication channel for receiving data from the primary communication channel;
a sampling module communicatively coupled to the primary communication channel for sampling the primary signal; and
another equalizer communicatively coupled to the secondary communication channel for providing pre-equalization coefficients to the pre-equalization module of the first communication device based on analysis of samples taken from the sampling module, wherein the first communication device performs a portion of the analysis of the samples taken by the sampling device for developing the pre-equalization coefficients.

11. The communication system of claim 10, wherein the equalizer is a linear equalizer that is utilized with the second equalizer to establish a set of equalizer coefficients to be sent via the secondary communication channel to the first modem for updating the pre-equalization module.

12. The communication system of claim 11, wherein the another equalizer is a non-linear decision feedback equalizer having pre-equalization coefficients being used by the pre-equalization module for correcting non-linear distortions in the primary signal being sent upstream to the second communication device.

13. The communication system of claim 10, wherein the first communication device and the second communication device work together in the analysis of the samples taken by the sampling device for development of pre-equalization coefficients for the first communication device.

14. The communication system of claim 10, wherein the pre-equalization module is located in the second communication device and the pre-equalization occurs in the second communication device.

15. The communication system of claim 10, wherein the first communication device is a client modem.

16. The communication system of claim 10, wherein the second communication device is a server modem.

17. The communication system of claim 10, wherein the first communication device is a server modem.

18. The communication system of claim 10, wherein the second communication device is a client modem.

19. A communication system, comprising:

a primary communication channel for transmission of a primary signal;

a secondary communication channel for transmission of a secondary signal; a first communication device having a pre-equalization module communicatively coupled to the primary communication channel, the pre-equalization module for modifying the primary signal being sent by the first communication device;

a second communication device having an equalizer communicatively coupled to the primary communication channel for receiving data from the primary communication channel;

a sampling module communicatively coupled to the primary communication channel for sampling the primary signal; and another equalizer communicatively coupled to the secondary communication channel for providing pre-equalization coefficients to the pre-equalization module of the first communication device based on analysis of samples taken from the sampling module, wherein the first communication device and the second communication device each perform a portion of the analysis of the samples for development of pre-equalization coefficients and exchange the pre-equalization coefficients with each other.

20. A method for performing non-linear equalization in a system for transmitting data that utilizes pre-equalization, comprising:

sampling a communication channel;

analyzing a portion of the samples at a server device to calculate pre-equalization coefficients; further comprising:

determining the processing capability of the client device;

determining an allocation of pre equalization analysis processing between the client device and the server device; and analyzing a portion of the samples at a client device to calculate pre equalization coefficients.

21. The method of claim 20 wherein determining the allocation of pre-equalization analysis processing between the client device and the server device comprises selecting one of two or more processing modes.

22. The method of claim 21 wherein the two or more processing modes includes one or more of the group comprising a mode where all processing is performed by the server device, a mode where all processing is performed by the client device, a mode where a first fraction of the processing is done by the server device, and mode where a second fraction of the processing is done by the client device.

* * * * *